United States Patent
Shimizu

[19]

[11] Patent Number: 6,056,535
[45] Date of Patent: May 2, 2000

[54] INJECTION MOLDING MACHINE

[75] Inventor: Junichi Shimizu, Nagano-ken, Japan

[73] Assignee: Nissei Plastic Industrial Co., Ltd., Nagano-Ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/968,289

[22] Filed: Nov. 12, 1997

[30] Foreign Application Priority Data

Nov. 14, 1996 [JP] Japan .................................. 8-303004

[51] Int. Cl.⁷ .................................................... B29C 45/40

[52] U.S. Cl. ........................... 425/556; 264/69; 264/334; 425/570; 425/572

[58] Field of Search .................................... 425/554, 556, 425/570, 572; 264/69, 334

[56] References Cited

U.S. PATENT DOCUMENTS

| | | |
|---|---|---|
| 4,832,254 | 5/1989 | Peuke et al. . |
| 5,472,335 | 12/1995 | Morikita ..................................... 425/556 |
| 5,658,600 | 8/1997 | Okada et al. ........................ 425/192 R |

*Primary Examiner*—Tim Heitbrink
*Attorney, Agent, or Firm*—Weingarten, Schurgin, Gagnebin & Hayes LLP

[57] ABSTRACT

An injection molding machine comprising a processing pin provided in a fixed mold side is provided. A movable member is arranged in a space between the fixed mold and a fixed plate, the processing pin can be moved forward and backward together with the movable member with rear end portion thereof fixed to the movable member. An end portion of the processing pin is inserted into a mold plate so that it can go in and out of a gate or a cavity by the forward and backward movement of the movable member moved by a drive unit. The above construction can eliminate positional limitation due to a position of a projecting pin in a conventional injection molding machine.

17 Claims, 4 Drawing Sheets

INJECTION MOLDING MACHINE

BACKGROUND OF THE INVENTION

1. Field of the Invention

The present invention relates to an injection molding machine which can carry out processing, such as gate cutting, compression or the like on a resin injected and filled in a mold from the outside of the mold.

2. Background Art

There is already known an injection molding machine which can carry out processing, such as gate cutting, boring, compression or the like by external operation before a molten resin injected and filled in a cavity in a mold is cooled and solidified.

However, processing in the mold in this type of conventional molding machine is carried out by providing processing pins in a movable mold together with projecting pins. Therefore, this type of molding machine has such problems that the installation positions of the processing pins are restricted, gate cutting must be carried out through a projecting plate having a plurality of projecting pins, and the projecting pins and processing pins must be double-structured according to type of product to attain the object of the present invention.

SUMMARY OF THE INVENTION

It is an object of the present invention which has been made to solve the above problems of the prior art to provide a novel injection molding machine which eliminates positional limitation when the processing pin is provided in the movable mold by providing it in the fixed mold and can be adapted to gate cutting for various-structured gates and even to processing in the mold such as boring, compression or the like of a product.

The present invention which has the above object is to provide an injection molding machine which comprises a movable member provided in a space between a fixed plate and a fixed mold attached to the fixed plate, a processing pin provided in the fixed mold with a rear end portion thereof fixed to the movable member, and a drive unit which moves forward and backward the processing pin together with the movable member so that an end portion of the processing pin can go in and out of a gate or a cavity formed by the fixed mold and the movable mold on the movable plate.

The drive unit can be a vibrating unit. When the fixed mold comprises a hot runner block in a rear portion thereof, the end portion of the processing pin is provided in the fixed mold through the hot runner block.

Further, an end surface of the processing pin faces the gate in the cavity and can carry out gate cutting by going in and out of the cavity by the operation of the above drive unit even when the gate is one selected from a submarine gate, an overlap gate, a disk gate, a direct gate or the like.

Moreover, the end surface of the above processing pin faces the cavity and bore or compress the resin in the cavity by going in and out of the cavity by the operation of the above drive unit.

As the drive unit may be used a cylinder unit which is activated by hydraulic pressure or air pressure, a servo motor with a ball screw shaft, or the like. The movement control and vibration control of the movable member can be finely adjusted by using electric means such as limit switches, encoders or the like. Use of these means makes it possible to carry out processing in the mold from the fixed mold side and release the product from the mold by pushing it by the projecting pins from the mold side.

Since the processing pin and the projecting pin are provided in the fixed mold and the movable mold, respectively, even when a processing position and a projecting position are set to the same position, the operations of these pins are carried out one after another, thereby causing no problem and imposing no restrictions on the position of the processing pin unlike the case where both the processing pin and the projecting pin are provided in the movable mold. Therefore, this structure can be adopted in a small-sized injection molding machine. In addition, the processing pin and the drive unit can be directly applied to the ejection of a product from the fixed mold side, the formation of a compression stroke in an injection compression molding, auxiliary driving of mold opening force, slide core driving, insert holding for insert molding and the like in molding which does not require processing in the mold.

BRIEF DESCRIPTION OF THE DRAWINGS

The above and other objects and advantages of this invention will become clear from the following description with reference to the accompanying drawings, wherein.

DETAILED DESCRIPTION OF THE PREFERRED EMBODIMENTS

Figure 1:
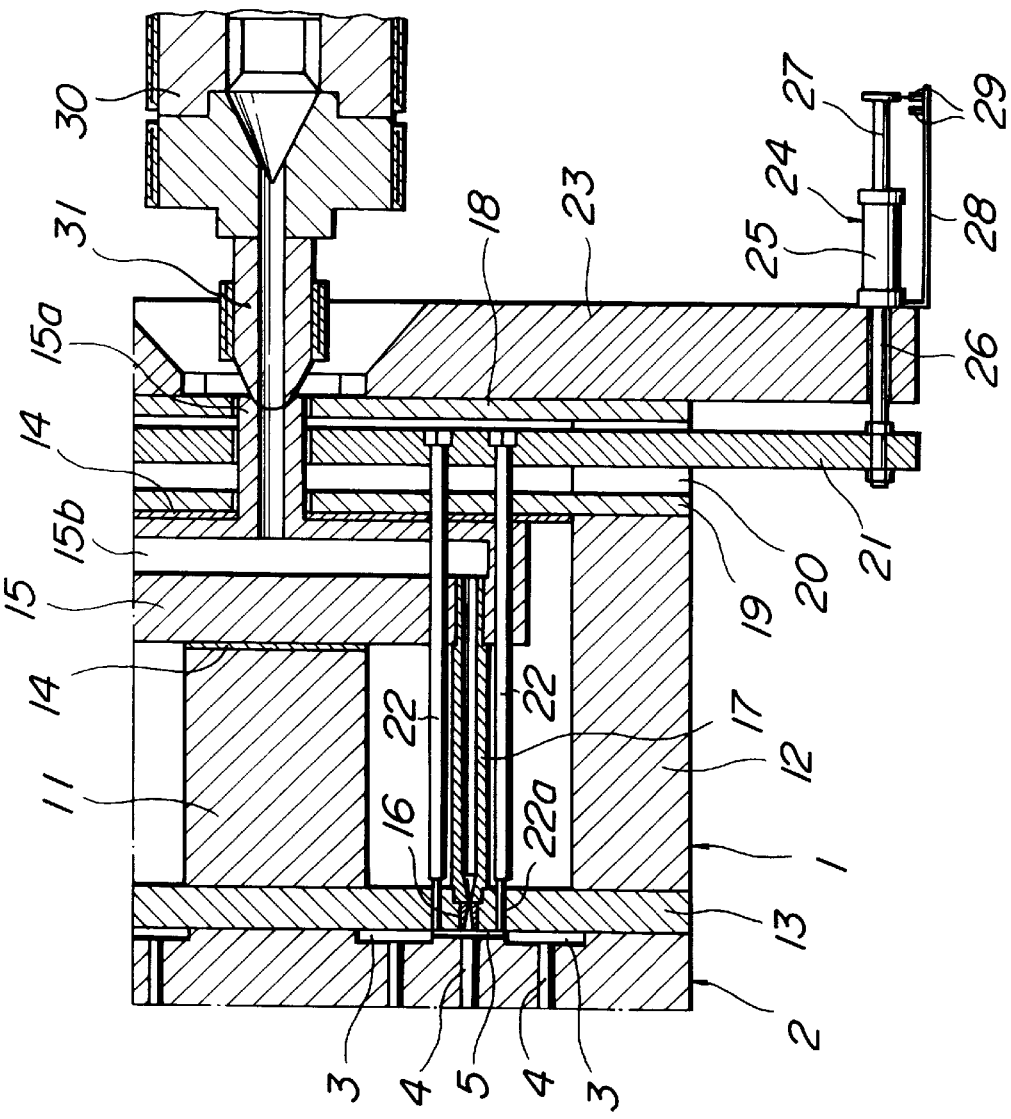
FIG. 1 is a partial longitudinal side view of an injection molding machine according to an embodiment of the present invention.

FIG. 1 illustrates an injection molding machine having a mold employing a hot runner. Reference numeral 1 denotes a fixed mold, reference numeral 2 denotes a movable mold, and reference numeral 3 denotes cavities formed by connecting these molds.

This movable mold 2 is attached to a movable plate (not shown) as usual and a projecting pin 4 is provided in the cavities 3, 3 and a sprue forming portion 5 connecting these cavities.

The fixed mold 1 comprises a hollow square cylindrical mold base 12 having a pedestal 11 at a central portion thereof, a mold plate 13 provided at the front of the mold base 12, and a hot runner block 15 which is attached to the rear of the pedestal 11 with a heat insulating material 14 surrounding the block 15. A hot runner member 17 is provided from the hot runner block 15 to a sprue bush 16 provided within the mold plate 13.

A required space 20 is formed by providing a partition plate 19 between a mounting plate 18 at a rear end of the mold base 12 and the hot runner block 15 so that a plate movable member 21 is inserted into the space 20 in such a manner that it can move forward and backward freely. A pair of processing pins 22 are fixed to the movable member 21 at rear ends thereof and extend to the mold plate 13 in parallel to the hot runner member 17 within the base 12. End portions 22a of the processing pins 22 have a small diameter and extend through the mold plate 13, and end surfaces thereof face gates so that they can go in and out of the gates between the cavities 3 and the sprue forming portion 5.

The movable member 21 is connected to a drive unit 24 attached to the exterior side of the fixed plate after the mounting plate 18 is placed in contact with the interior side of the fixed plate 23 and the fixed mold 1 is attached to the fixed plate 23, thereby freely moving forward and backward together with the processing pins 22 by the operation of the drive unit 24.

This drive unit 24 comprises a cylinder 25 fixed to the fixed plate, an operation rod 26 and a control rod 27 extending through the cylinder 25 and coupled with a piston in the cylinder, a detection rod 28 fixed to the cylinder in parallel to the control rod 27, and a pair of limit switches 29 for positional detection attached to an end portion of the detection rod. The movable member 21 is connected to an end portion of the operation rod 26 extending through the fixed plate 23 and projecting toward an inner side of the fixed plate 23.

In the above configuration, when a molten resin is injected into the hot runner block 15 from an injection unit 30 after a nozzle 31 of the injection unit 30 touches a hot runner gate 15a projecting from a rear center portion of the fixed mold 1, the molten resin in the hot runner 15b flows from the hot runner member 17 to the sprue forming portion 5 formed by closing the molds through the sprue bush 16 and is filled in the cavities 3,3 through the gates.

When the drive unit 24 is activated by hydraulic pressure or air pressure to move the operation rod 26 forward after the injection step is switched from filling to dwelling as usual, the movable member 21 moves forward together with the processing pins 22 to push the ends thereof facing the gates into the gates to carry out gate cutting. The inserting amount of the end portions of the processing pins into the gates can be set by the pair of limit switches 29, whereby the end surfaces of the processing pins 22 are pushed until they contact the movable mold to complete gate cutting.

After completing the gate cutting, the drive unit 24 switches to backward movement, whereby the movable member 21 returns to the original position together with the processing pins 22 so that the end surfaces of the processing pins 22 face the gates again. Thereafter, the movable mold 2 is opened by the retreat of the movable plate, a sprue generated in the sprue forming portion 5 and a product molded in the cavities 3 are released from the movable mold 2 by pushing them by the projecting pins 4,4.

Figure 2A:
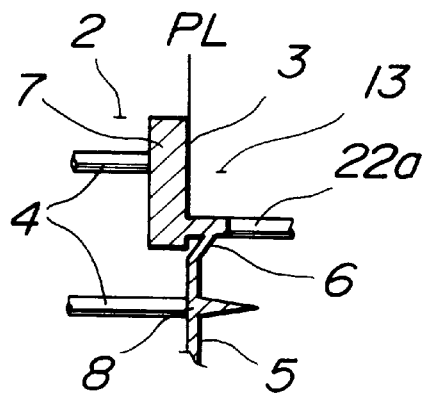
FIGS. 2(A) and 2(B) are schematic diagrams showing the location of an end portion of a processing pin with respect to a submarine gate and gate cutting.
Figure 2B:
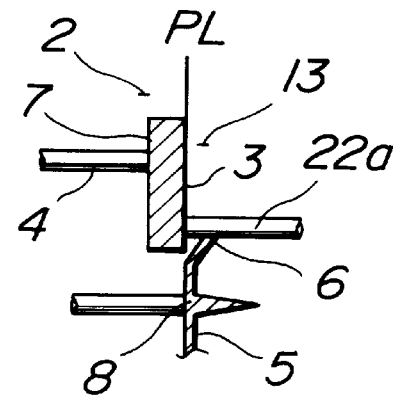
Figure 3A:
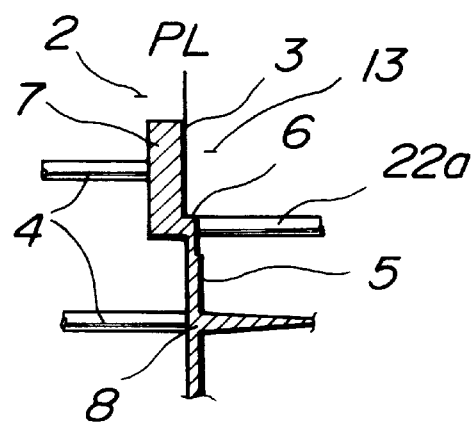
FIGS. 3(A) and 3(B) are schematic diagrams showing the location of an end portion of a processing pin with respect to an overlap gate and gate cutting.
Figure 3B:
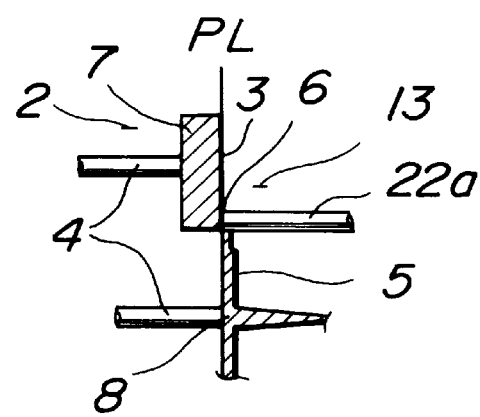
Figure 4A:
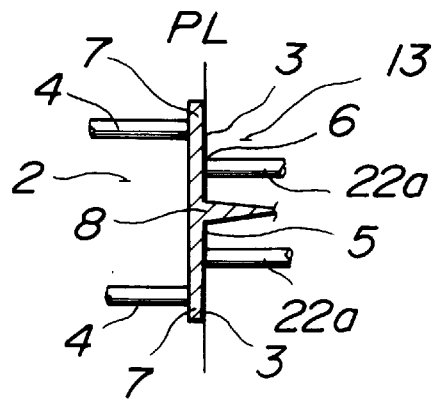
FIGS. 4(A) and 4(B) are schematic diagrams showing the location of an end portion of a processing pin with respect to a disk gate and gate cutting.
Figure 4B:
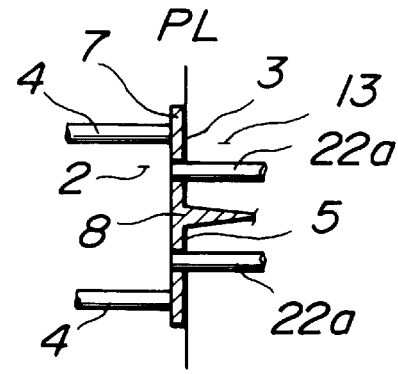

FIGS. 2(A) to 4(B) are schematic diagrams showing gate cutting for gates having different structures by the processing pins whose end portions 22a extend through the mold plate 13 so that end surfaces thereof face the gate(s) 6 so that they can go in and out of the gate(s) 6 between the cavity(s) 3 and the sprue forming portion(s) 5. FIG. 2(A), FIG. 3(A) and FIG. 4(A) show the end portion of the processing pin before gate cutting and FIG. 2(B), FIG. 3(B) and FIG. 4(B) show the end portion of the processing pin after gate cutting. Lines PL indicate parting lines between the movable mold 2 and the mold plate 13.

FIGS. 2(A) and 2(B) show a submarine gate. The end portion 22a of the processing pin is located at the end of the gate 6 formed within the mold plate and the end surface thereof faces the gate. This end portion 22a of the processing pin is pushed into the gate 6 until the end surface thereof contacts the surface of the movable mold 2 to carry out gate cutting before a molten resin which flows from the sprue forming portion 5 into the cavity 3 through the gate 6 and is filled in the cavity 3 is completely solidified. Thereby, the product 7 molded in the cavity 3 and the sprue 8 of the sprue forming portion 5 are separated from each other and are released from the surface of the movable mold 2 by pushing them by the projecting pins 4 on the movable mold after the mold is opened.

FIGS. 3(A) and 3(B) show an overlap gate. The end portion 22a of the processing pin is located at the end of the gate 6 which is overlapped with the cavity 3 and formed within the mold plate together with the sprue forming portion 5 and the end surface of the processing pin faces the gate. Gate cutting by this end portion 22a of the processing pin is carried out in the same manner as that in case for the above submarine gate. The molded product 7 and the sprue 8 are separated from each other and are released from the surface of the movable mold 2 by pushing them by the projecting pins 4 on the movable mold after the mold is opened.

FIGS. 4(A) and 4(B) show a disk gate. The end portions 22a of the processing pins have end surfaces facing the gates 6 at the boundary of the cavity 3 formed within the movable mold together with the sprue forming portion 5. Gate cutting by this end portions 22a of the processing pins is carried out in the same manner as that in the case for the submarine gate. The molded product 7 and the sprue 8 are separated from each other and are released from the surface of the movable mold 2 by pushing them by the projecting pins 4 on the movable mold after the mold is opened.

FIGS. 5(A) to 7(B) are schematic diagrams showing the case where the product 7 molded in the cavities 3 is processed in various manners. The end portion 22a of the processing pin extends through the mold plate 13 so that an end surface thereof faces the cavity 3 so that it can go in and out of the cavity 3 freely.

Figure 5A:
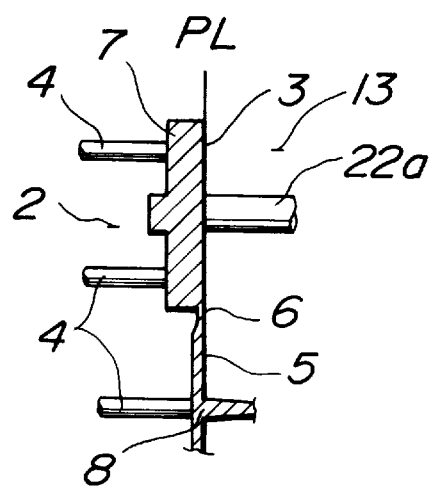
FIGS. 5(A) and 5(B) are schematic diagrams showing the location of an end portion of a processing pin with respect to a cavity and boring.
Figure 5B:
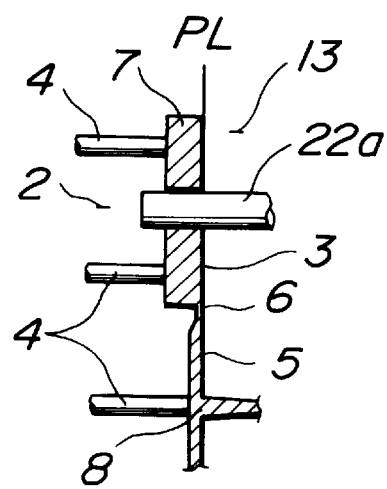

FIGS. 5(A) and 5(B) show the case where a through hole 7 is formed in the product 7. The end portion 22a of the processing pin 22 extends through the mold plate 13 at a position where an end surface thereof faces the cavity 3 formed within the movable mold together with the sprue forming portion 5. This end portion 22a of the processing pin is pushed into a resin in the cavity until the end surface thereof contacts the surface of the movable mold 2 before a molten resin injected and filled in the cavity 3 from the sprue forming portion 5 through the gate 6 is completely cooled and solidified and pulled to the original position after the resin is solidified. Thereby, a trace made by pulling the end portion 22a of the processing pin is left on the product 7 as a through hole and the product 7 is released from the mold by the projecting pins 4 on the movable mold side after the mold is opened.

Figure 6A:
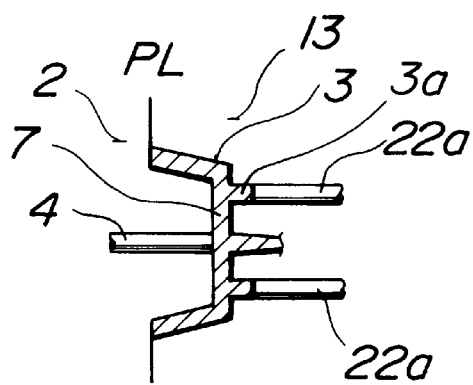
FIGS. 6(A) and 6(B) are schematic diagrams showing the location of an end portion of a processing pin with respect to a cavity and compression.
Figure 6B:
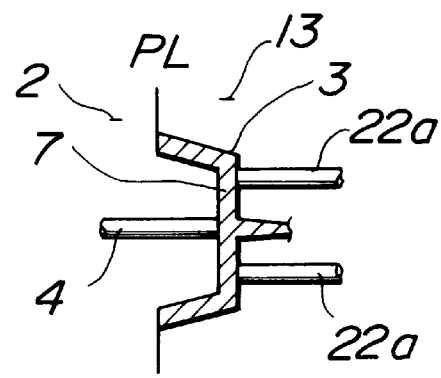

FIGS. 6(A) and 6(B) are the case where the product 7 is compressed by the end portion 22a of the processing pin. The cavity 3 is formed on the parting plane between the movable mold 2 and the mold plate 13. The end portion 22a of the processing pin extends through the mold plate 13 at a position where the end surface thereof faces a recessed portion 3a formed in the mold plate as a compression portion of the cavity 3.

This end portion 22a of the processing pin is pushed so as to align the end surface thereof with the surface of the mold plate before the molten resin injected and filled in the cavity 3 is completely cooled and solidified. Thereby the molten resin in the recessed portion 3a is forced into the cavity 3 and compressed. The end portion 22a of the processing pin is returned to the original position after the resin is solidified. The product 7 of which the residual distortion is removed by the compression is released from the mold by pushing it by the projecting pin 4 on the movable mold after the mold is opened.

Figure 7A:
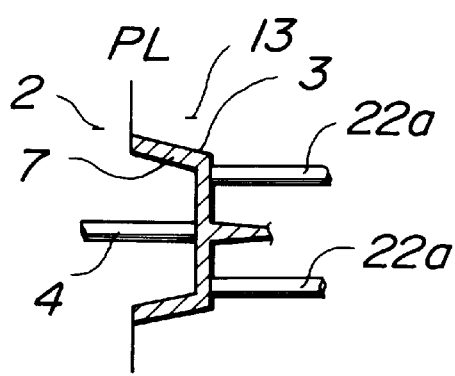
FIGS. 7(A) and 7(B) are schematic diagrams showing the location of an end portion of a processing pin with respect to a cavity and compression and thin wall formation.
Figure 7B:
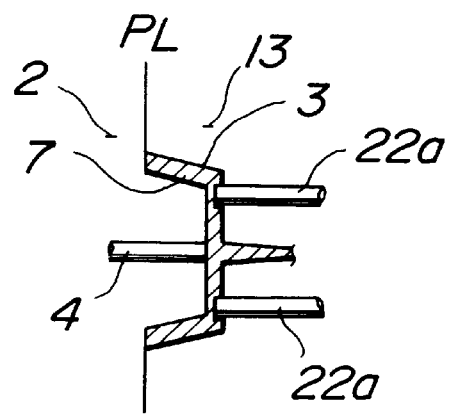

FIGS. 7(A) and 7(B) show the case where the product 7 is compressed by the end portion 22a of the processing pin and a compressed portion is formed thin. The difference from the compression of FIGS. 6(A) and 6(B) is that the recessed portion 3a is omitted and the end portion 22a is inserted into the mold plate 13 until the end surface thereof forms a part of the surface of the mold plate 13 and forced into the resin in the cavity 3 from that position to compress the resin, and the compressed portion is formed thin.

Although processing such as gate cutting, boring, compression or the like by means of the end portion 22a of the processing pin can be carried out by one time of forward movement of the processing pin 22, it may be carried out while the processing pin 2 is vibrated. This vibration can be carried out by the forward movement of the operation rod 26 of the drive unit 24 while it is finely vibrated forward and backward. The size of the amplitude of the vibration can be set by the interval between the pair of limit switches 29.

As is evident from the above embodiment, since the projecting pins and the processing pins are provided in the movable mold and the fixed mold, respectively, in this invention, the installation locations of the processing pins are not restricted unlike the prior art and can be installed at any desired positions according to product. Therefore, it is possible to arrange them at the same position, which has been difficult in the prior art, and to carry out processing in the mold even in an injection molding machine having a small-sized mold. Since only projecting pins have to be provided on the movable mold, the internal structure of the injection molding machine is simplified. Thus, the present invention has an advantage in production.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An injection molding machine comprising:
    a movable member provided in a space between a fixed plate and a fixed mold, wherein said fixed mold is attached to said fixed plate;
    a processing pin provided in said fixed mold with a rear end portion thereof fixed to said movable member and a front end passed through a mold plate;
    a drive unit for moving forward or backward said processing pin together with said movable member so that said front end portion of said processing pin can be driven through said mold plate to go in and out of a gate or a cavity formed between a movable mold and said mold plate; and
    a projecting pin provided in said movable mold, and operable to release a product from the moveable mold by pushing it from the moveable mold side.

2. The injection molding machine of claim 1, wherein said drive unit is a vibrating unit.

3. The injection molding machine of claim 1, wherein said fixed mold comprises a hot runner block in a rear portion thereof and the end portion of said processing pin is provided in said fixed mold through the hot runner block.

4. The injection molding machine of claim 1, wherein the gate is a submarine gate, an end surface of said processing pin faces the submarine gate in the cavity and carries out gate cutting by going in and out of the cavity by the operation of said drive unit.

5. The injection molding machine of claim 1, wherein the gate is an overlap gate, an end surface of said processing pin faces the overlap gate in the cavity and carries out gate cutting by going in and out of the cavity by the operation of said drive unit.

6. The injection molding machine of claim 1, wherein the gate is a disk gate, an end surface of said processing pin faces the disk gate in the cavity and carries out gate cutting by going in and out of the cavity by the operation of said drive unit.

7. The injection molding machine of claim 1, wherein the gate is a direct gate, an end surface of said processing pin faces the direct gate in the cavity and carries out gate cutting by going in and out of the cavity by the operation of said drive unit.

8. The injection molding machine of claim 2, wherein the gate is a submarine gate, an end surface of said processing pin faces the submarine gate in the cavity and carries out gate cutting by going in and out of the cavity by the operation of said drive unit.

9. The injection molding machine of claim 2, wherein the gate is an overlap gate, an end surface of said processing pin faces the overlap gate in the cavity and carries out gate cutting by going in and out of the cavity by the operation of said drive unit.

10. The injection molding machine of claim 2, wherein the gate is a disk gate, an end surface of said processing pin faces the disk gate in the cavity and carries out gate cutting by going in and out of the cavity by the operation of said drive unit.

11. The injection molding machine of claim 2, wherein the gate is a direct gate, an end surface of said processing pin faces the direct gate in the cavity and carries out gate cutting by going in and out of the cavity by the operation of said drive unit.

12. The injection molding machine of claim 1, wherein an end surface of said processing pin faces the cavity and bores a resin in the cavity by going in and out of the cavity by the operation of said drive unit.

13. The injection molding machine of claim 2, wherein an end surface of said processing pin faces the cavity and bores a resin in the cavity by going in and out of the cavity by the operation of said drive unit.

14. The injection molding machine of claim 3, wherein an end surface of said processing pin faces the cavity and bores a resin in the cavity by going in and out of the cavity by the operation of said drive unit.

15. The injection molding machine of claim 1, wherein an end surface of said processing pin faces a cavity and compresses a resin in the cavity by going in and out of the cavity by the operation of said drive unit.

16. The injection molding machine of claim 2, wherein an end surface of said processing pin faces a cavity and compresses a resin in the cavity by going in and out of the cavity by the operation of said drive unit.

17. The injection molding machine of claim 3, wherein an end surface of said processing pin faces a cavity and compresses a resin in the cavity by going in and out of the cavity by the operation of said drive unit.

* * * * *

UNITED STATES PATENT AND TRADEMARK OFFICE
CERTIFICATE OF CORRECTION

| | |
|---|---|
| PATENT NO. | : 6,056,535 |
| DATED | : May 2, 2000 |
| INVENTOR(S) | : Junichi Shimizu |

It is certified that error appears in the above-identified patent and that said Letters Patent is hereby corrected as shown below:

Column 5,
Line 23, "2" should read -- 22 --.

Signed and Sealed this

Twenty-third Day of October, 2001

Attest:

*Nicholas P. Godici*

NICHOLAS P. GODICI
*Acting Director of the United States Patent and Trademark Office*

*Attesting Officer*